United States Patent [19]

Harney

[11] 4,053,763

[45] Oct. 11, 1977

[54] METHOD AND APPARATUS FOR PULSE STACKING

[75] Inventor: Robert C. Harney, Livermore, Calif.

[73] Assignee: The United States of America as represented by the United States Energy Research and Development Administration, Washington, D.C.

[21] Appl. No.: 689,751

[22] Filed: May 25, 1976

[51] Int. Cl.² .................. H01J 39/12; G02B 27/10; G02F 1/01; G02F 1/03

[52] U.S. Cl. ............................... 250/206; 250/578; 350/150; 350/151; 350/160 R; 350/169; 350/172; 356/112; 332/7.51; 331/94.5 M

[58] Field of Search ............ 250/206, 578; 332/7.51; 356/112; 350/150, 151, 160 R, 169, 171, 172, 321; 331/94.5 M

[56] References Cited

U.S. PATENT DOCUMENTS 3,482,184  12/1969  Schneider et al. ............... 350/150 X
3,501,223  3/1970   Rack ............................... 350/150 X Primary Examiner—Harold A. Dixon
Assistant Examiner—Charles F. Roberts
Attorney, Agent, or Firm—Dean E. Carlson; Roger S. Gaither; L. E. Carnahan

[57] ABSTRACT

An active pulse stacking system including an etalon and an electro-optical modulator apparatus combined with a pulse-forming network capable of forming and summing a sequence of time-delayed optical waveforms arising from, for example, a single laser pulse. The Pockels cell pulse stacker may attain an efficiency of about 2.6% while providing a controllable faster-than-exponential time rise in transmitted pulse intensity.

28 Claims, 10 Drawing Figures

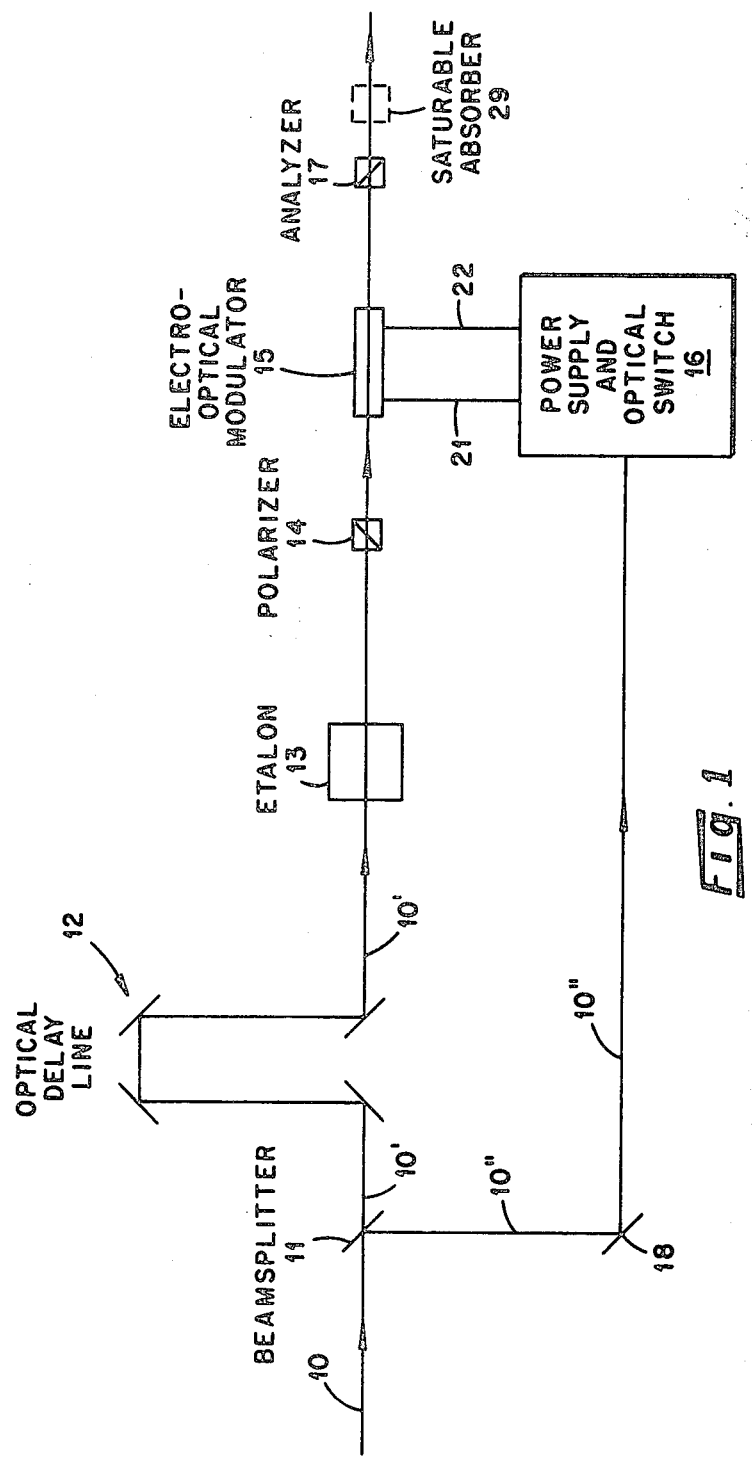

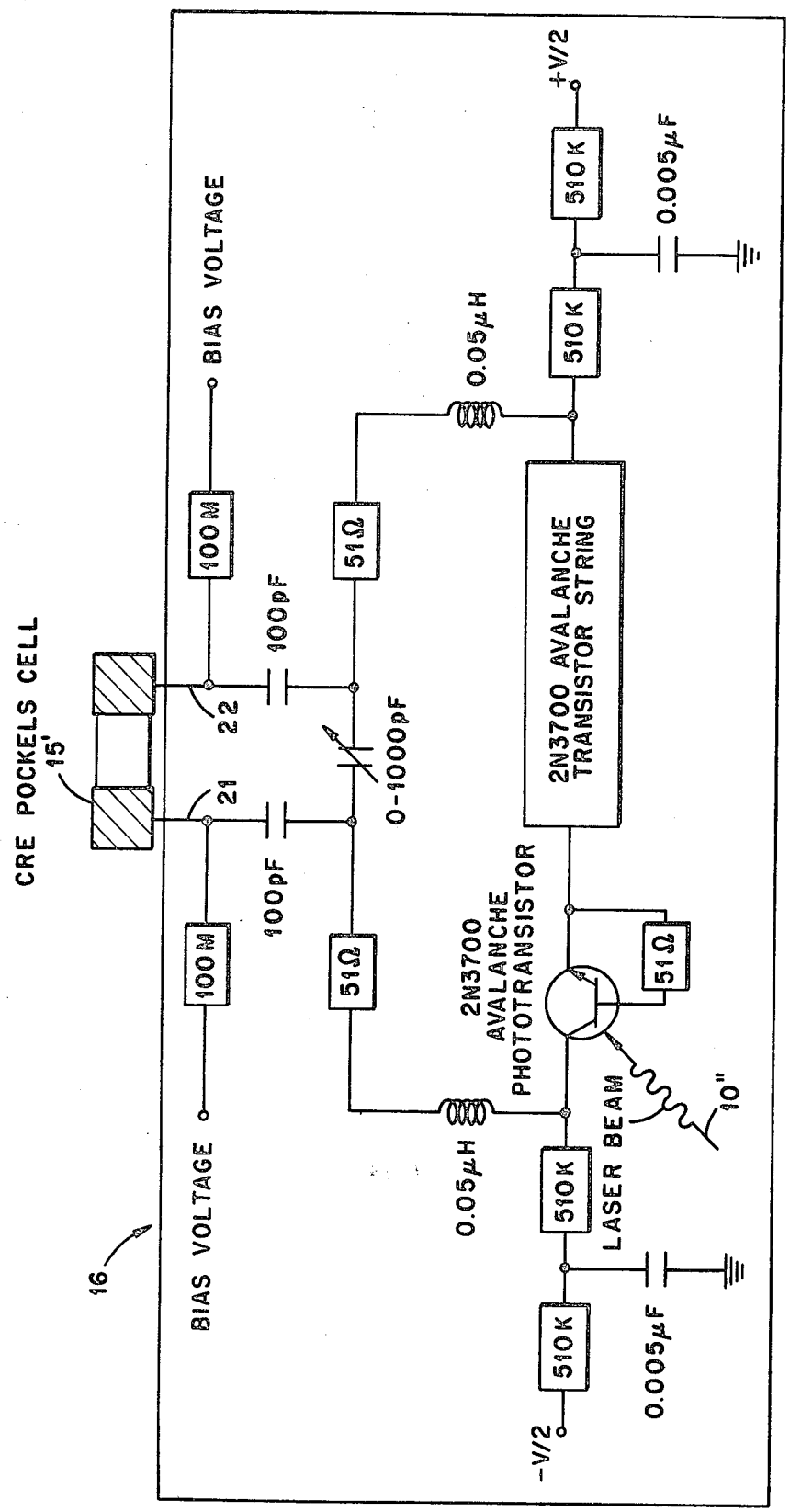

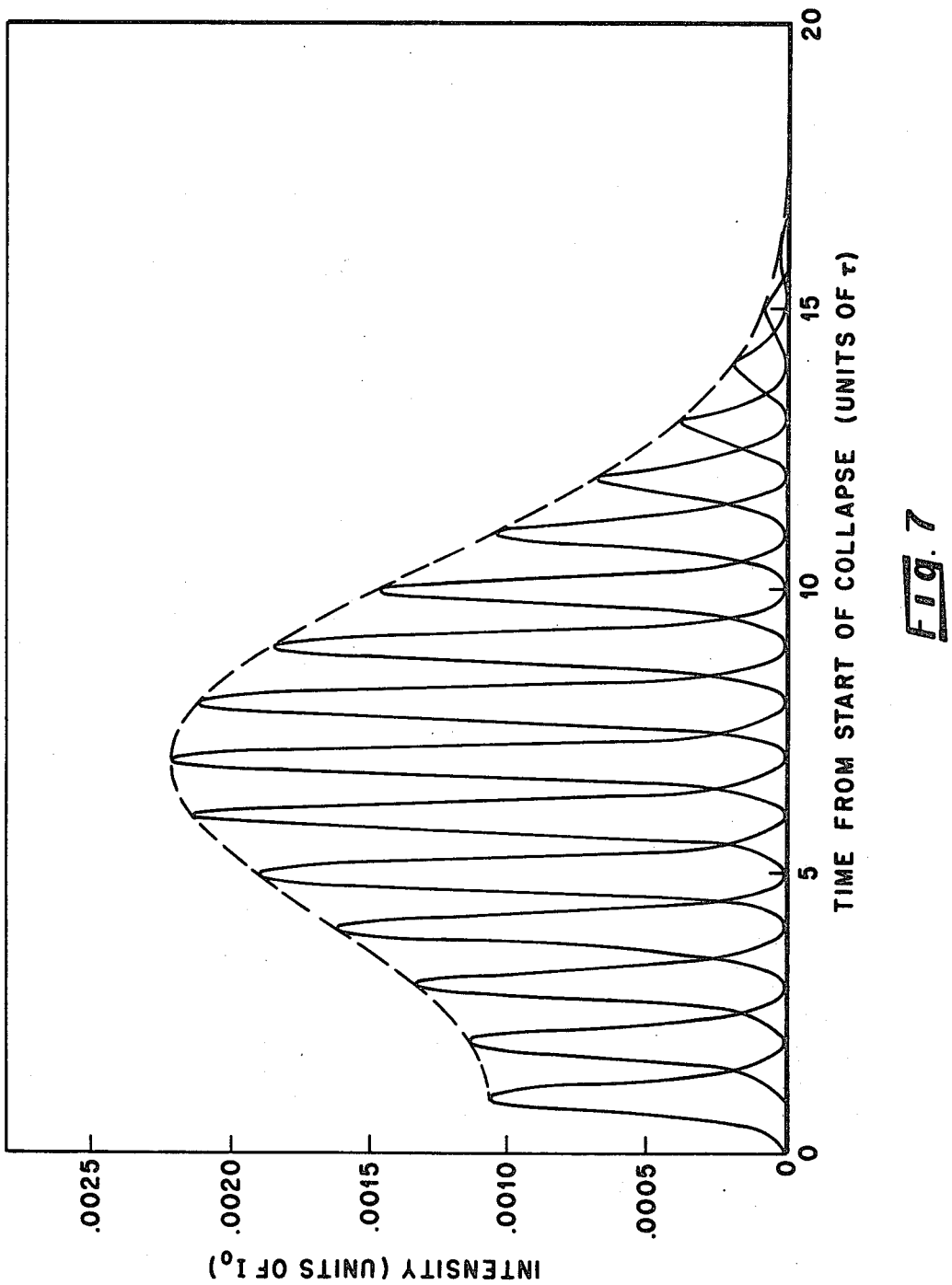

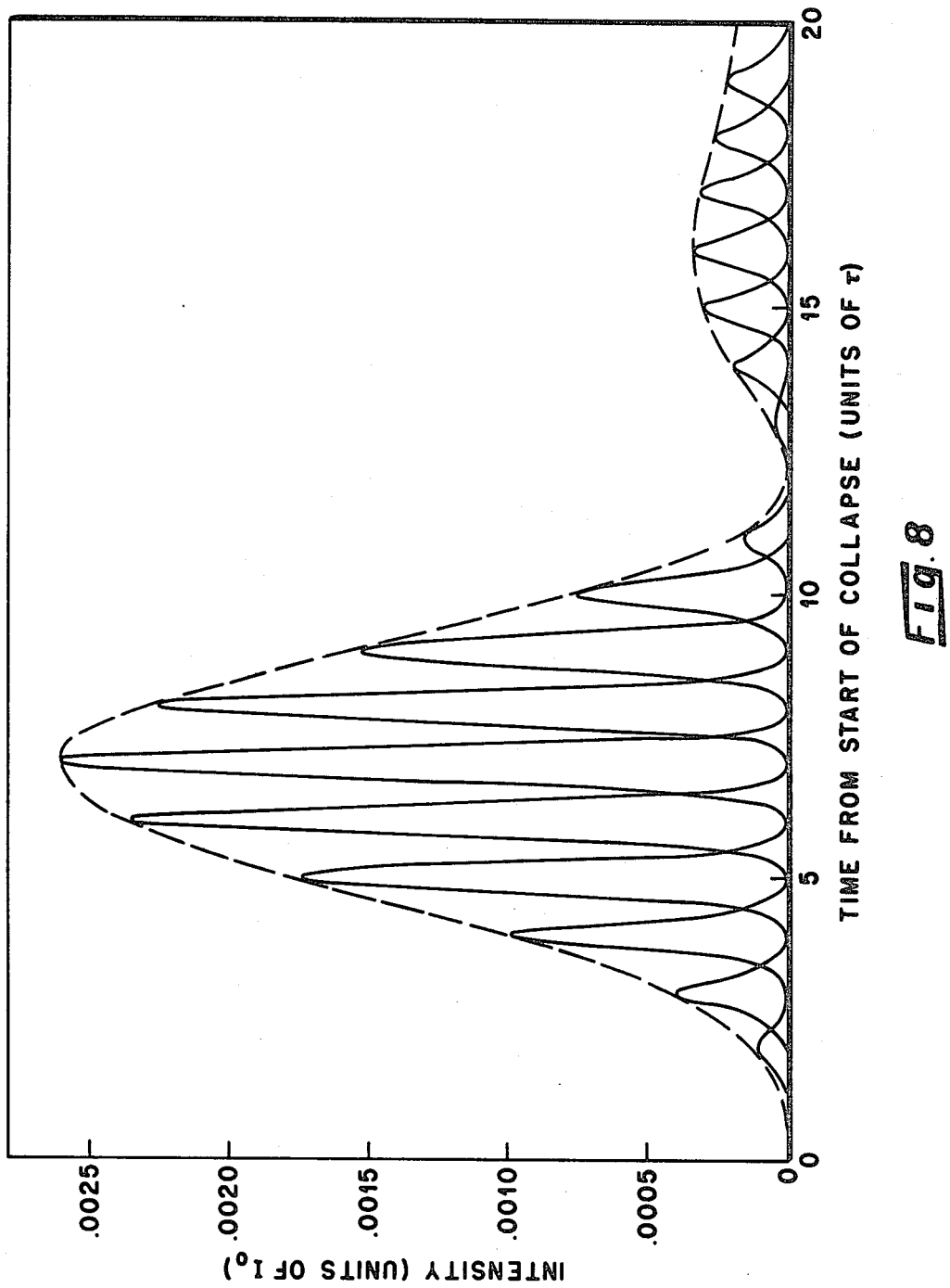

METHOD AND APPARATUS FOR PULSE STACKING

BACKGROUND OF THE INVENTION

The invention described herein was made in the course of, or under, Contract No. W-7405-ENG-48 with the Energy Research and Development Administration.

Certain physical processes involving laser irradiation require radiation intensities which rise in a peculiar, faster-than-exponential fashion. For example, the current schemes for achieving net energy gain from laser fusion microexplosions require adiabatic or isentropic compression of the fusion fuel by tailored laser pulses utilizing such intensities, see J. L. Emmett et al., Sci. Am. 230, 24 (1974) and R. E. Kidder, Nuclear Fusion, 14, 797 (1974). As pulses with the desired behavior cannot be generated directly by a laser oscillator, some means of modifying the original intensity distribution must be found. One method, known as pulse-stacking, splits a single pulse into a number of pulses, changes their intensities by appropriate amounts, and recombines them with appropriate delays to yield a pulse of the desired intensity distribution or pulse shape. Numerous pulse-stacking schemes have been proposed in the past, among which the passive type schemes have received the most attention as they require almost no attention after they have been fabricated and aligned. U.S. Pat. No. 3,879,109, issued Apr. 22, 1975, in the name of C. F. Thomas, exemplifies the passive type pulse stacking apparatus. However, the passive schemes generally lack flexibility in the range of pulse durations and risetimes which are of interest. Thus, a need exists for a pulse stacking approach which is flexible in both the risetimes and pulse durations it can generate.

RELATED APPLICATION

Copending U.S. patent application Ser. No. 689,766, filed May 25, 1976, to Harney et al., entitled "Improved Passive and Active Pulse Stacking Schemes for Pulse Shaping", and assigned to the same assignee, relates to the same general subject matter of this application.

SUMMARY OF THE INVENTION

The present invention provides a pulse stacking system which fills the above-mentioned need of flexibility in the range of pulse durations and risetimes which it can generate. The invention is an active pulse stacking system utilizing an etalon, light polarizer and analyzer means, and an electo-optical modulator whose associated phase shift characteristics may be linear or non-linear in the applied voltage. By varying the etalon spacing, the modulator voltage bias and the value of a shunt capacitor associated with the modulator, one may vary the pulse delay time, the maximum intensity and risetime of the transmitted wave, thus controlling the pulse shape of a beam of laser light energy, for example.

Therefore, it is an object of this invention to provide an active pulse stacking system.

A further object of the invention is to provide a system for controlling the pulse shape of a laser beam while allowing both flexibility in the range of pulse durations and risetimes it can generate.

Another object of the invention is to provide an active pulse stacking system utilizing an etalon, light polarizer and analyzer means and an electro-optical modulator.

Another object of the invention is to provide a pulse stacking system, including an etalon, light polarizer and analyzer means and an electro-optical modulator apparatus combined with a pulse-forming network capable of forming and summing a sequence of time-delayed optical waveforms arising from a single laser pulse.

Other objects of the invention will become readily apparent from the following description and accompanying drawings.

BRIEF DESCRIPTION OF THE DRAWINGS

FIG. 1 schematically illustrates the active pulse stacker made in accordance with the invention;

FIG. 3 schematically illustrates an embodiment of the electro-optical modulator and details of the power supply and optical switch of FIG. 1;

FIGS. 7 and 8 graphically illustrate the output pulse train with parameters which produced FIG. 4 except for different voltage parameters.

DESCRIPTION OF THE INVENTION

The present invention is directed to an active pulse stacking system utilizing an etalon, light polarizer and analyzer means and an electro-optical modulator, such as a cylindrical ring electrode (CRE) Pockels cell (linear or quadratic) Q-switched device or a Kerr cell. By varying the reflective etalon surface spacing, the modulator voltage bias, and the value of a shunt capacitor associated with the modulator, one may vary the pulse delay time, the maximum intensity and risetime of the transmitted wave. Representative transmission efficiencies are 0.5–2.6%.

The active pulse-stacker, described in detail hereinafter with respect to FIG. 1, broadly involves the use of an etalon positioned intermediate a beam splitter and a beam polarizer, in applications wherein the light beam is not previously polarized, with a CRE linear Pockels cell, or other type of Pockels cell, positioned intermediate the polarizer and a beam analyzer having crossed or differing polarization direction with respect to the polarizer. A single subnanosecond pulse incident on the etalon generates a train of pulses whose amplitudes decrease in time. As this pulse train enters the CRE Pockels cell the voltage across the Pockels cell electrodes is optically switched, by a power supply and switch mechanism, from the full-wave voltage to zero. This causes the transmission of the pulse train through the analyzer (second polarizer) to rise rapidly from zero to a maximum value and then fall rapidly back to zero. The superposition of the decaying etalon output on the Pockels cell transmission yields a pulse envelope which rises rapidly in time to a smooth maximum (which occurs somewhat earlier in time than the Pockels cell transmission maximum) and then decays even more rapidly back to zero.

Figure 4:
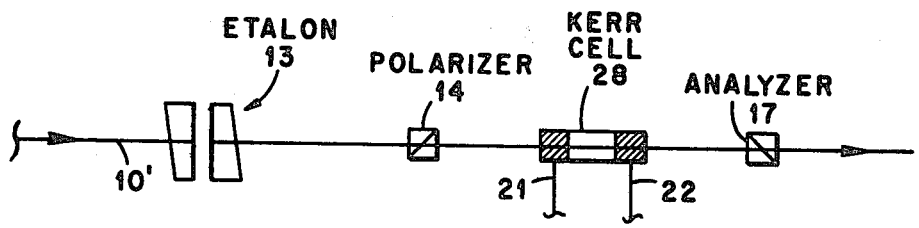
FIG. 4 illustrates schematically another electro-optical modulator embodiment of the FIG. 1 system.

Referring now to FIG. 1 a pulse of laser energy indicated at 10 from a laser oscillator, not shown, strikes a beam splitter 11 which splits beam 10 into a plurality of beams (only two shown) indicated at 10' and 10". Beam 10' passes through an optical delay line generally indicated at 12 (which may be omitted under certain applications) and is directed through an etalon 13 (see FIGS. 2a and 2b for details), a beam polarizer 14, an electro-optical modulator 15 (such as a cylindrical ring electrode (CRE) Pockels cell or Kerr cell as shown in FIGS. 3 and 4) having an associated power supply and optical switch 16 (see FIG. 3), and passes outwardly to a point of use through a beam analyzer or polarizer 17 with crossed or differing polarization relative to polarizer 14. The beam 10" is directed by a reflector 18 to power supply and optical switch 16. By application of an electric field of appropriate time variation to the electro-optical modulator 15, the polarization direction of the beam 10' incident thereon is rotated so that a portion or all of the initial intensity of the beam passes through the analyzer 17; with no voltage or with the full-wave voltage applied across the modulator 15, the analyzer 17 positioned downstream from the cell will normally result in a zero intensity beam. With an electric field applied over a short time period of the order of nanoseconds, the only time delayed pulses which will pass through the analyzer are those which arrive during the interval of temporal variation of the field.

For a pulse of intensity ($I_o$) incident on an etalon 13 of spacing $d$ (see FIG. 2a), the intensity ($I_m$) of the $m^{th}$ output pulse from the etalon is:

$$I_m = I_o(1-r)^2(1-R)^2 R^{2m-2}$$

where $R$ is the reflectivity of the mirror surfaces 19 and $r$ is the reflectivity of the etalon's other surfaces 20. The time delay ($T_m$) of the $m^{th}$ output pulse from the etalon with respect to the first output pulse therefrom is:

$$T_m = (m-1)Y$$

where $Y = 2d/c$ = the round trip time of the etalon, with $c$ being the speed of light. Mutual alignment of the pulses from the FIG. 2a embodiment of etalon 13 is easily accomplished by making the mirror surfaces 19 sufficiently parallel. In Fabry-Perot interferometers angular alignments of better than 0.1 μrad are routinely achieved. This corresponds to a linear displacement of less than 10 μm at a distance of 100 m, which is adequate for the applications envisioned, such as for laser fusion development efforts. Variation of the pulse spacing is easily achieved by translating one of the mirror surfaces 19 along the beam axis. The etalon surfaces 20 are wedge shaped to prevent unwanted secondary pulses from appearing in the output pulse train.

When a pulse with wavevector lying along the Z axis and initially polarized by polarizer 14 along the Y axis propagates through the electro-optical modulator 15 operated in the longitudinal mode, a component polarized along the x axis is generated. The magnitude of this component is given by:

$$E_x = E_{yo} \sin(\phi/2)$$

where $E_{yo}$ is the magnitude of the incident field, and the shift $\phi(t) = n_o^3 r_{63}(w/c) V(t)$, wherein $n_o$ is the linear refractive index of the nonlinear crystal, $r_{63}$ is the appropriate electro-optic coefficient, $w$ is the frequency of the incident radiation, $c$ is speed of light, and $V(t)$ is the applied voltage. The intensity transmitted by the polarizer electro-optical modulator system is:

$$I_x(t) = AI_y \sin^2[\phi(t)/2]$$

where $A$ is the attenuation of the polarizers and modulator at maximum transmission. Combining the etalon output with the modulator transmission yields:

$$I_m \approx I_o A(1-R)^2 R^{2m-2}(1-r)^2 \sin^2\left[\frac{\pi}{2}\frac{V(t)}{V_{\frac{1}{2}}}\right]$$

where $V_{1/2} = \pi c/n_o^3 r_{63} w$ is the half-wave voltage.

In certain applications of the pulse shape, such as fusion experiments, the voltage across the modulator must be switched on nanosecond time scales with picosecond jitter. One method of accomplishing this is with an optically triggered avalanche transistor circuit similar to those developed for ultrafast streaking cameras (see S. W. Thomas et al., App. Phys. Letts., 20, 83 (1972). Such a circuit, utilizing a cylindrical ring electrode (CRE) Pockels cell as the modulator 15', is shown in FIG. 3, although the details of the circuit do not constitute part of this invention. As shown in FIG. 3, an avalanche transistor string is connected across the electrode 21 and 22 of the Pockels cell 15' and the full-wave voltage is applied. A portion of the initial laser pulse (beam 10") strikes an avalanche phototransistor in the string, causing an avalanche breakdown. The voltage across the electrodes collapses to zero in a time of the order of a few nanoseconds with the jitter at the beginning of the collapse being of the order of 25 psec. This low jitter allows the voltage collapse to be timed to coincide with the arrival of the pulse train from the etalon by using a simple optical delay line. A variable capacitor connected across the electrodes allows the duration of the collapse to be varied over more than an order of magnitude.

The voltage waveform during the collapse is approximately one-half cycle of a sinusoid. Thus, the intensity of the $m^{th}$ pulse is:

$$I_m = I_o A(1-R)^2 R^{2m-2}(1-r)^2 \sin^2\left[\frac{\pi}{2}\cos(\alpha_m) + \frac{\pi}{2}\right]$$

where $\alpha_m = \pi mY/T$ where Y is the round trip time of the etalon, and $T$ is the total collapse time. This is plotted in FIG. 5 for the case $A = 1$, $r = 0$, $R = 0.9$, and $T = 20Y$. Only the rising portion of such a pulse envelope is useful for the applications envisioned, such as laser compression applications. However, the existence of the falling portion is frequently not detrimental to these applications. Summing the intensities transmitted in only the rising portion of the pulse envelope, one finds that approximately 0.5% of the incident pulse intensity is transmitted in a usable form, with $A = 1$, $r = 0$ (hereinafter assumed) and $R = 0.83$.

Figure 2A:
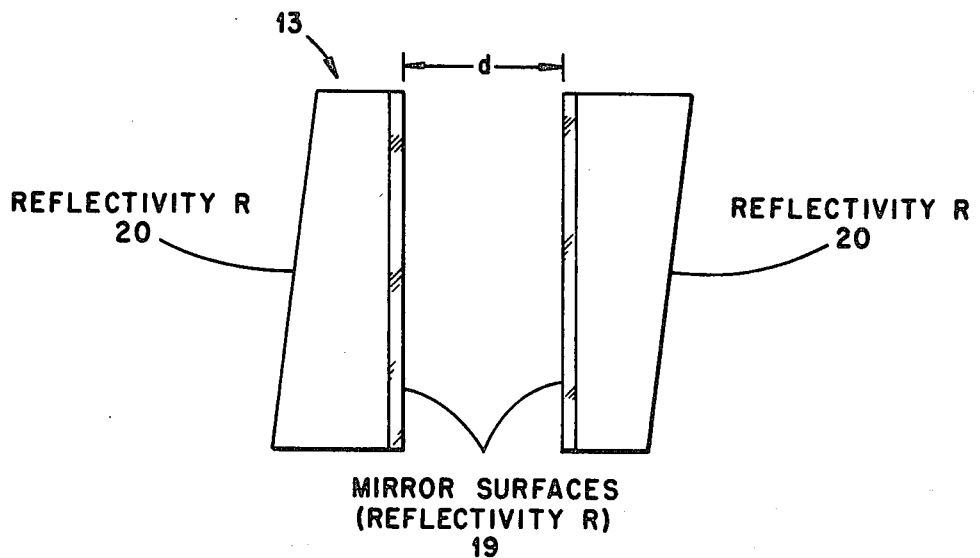
FIGS. 2a and 2b illustrate the details of embodiments of the etalon in FIG. 1.

This is the optimum choice for $R$ for a linear Pockels cell as the electro-optical modulator and the FIG. 2a etalon combined as shown in FIG. 1 with $N = 20$ pulses, if one would maximize the system efficiency $\eta$, defined as the ratio of integrated output intensity to integrated input intensity. The presence of the multiplicative factor $(1-R)^2$, in the expression for intensity $I_m$, indicates that one may not choose $R = 1$ for etalon reflectivity. It is understood that the invention is not limited to the CRE Pockels cell as other types of Pockels cell may be utilized.

Another measure of system performance is the maximum time rate of growth of the pulse envelope $\dot{e}$. The theoretical maximum growth rate for the linear Pockels cell, when used as the modulator of FIG. 1, is attained at reflectivity $R = 0.50$ for $N = 2$-pulses, where the rate is $\dot{e}_{max} = 0.0037(_o1\tau)$ for $N = 20$ pulses. The envelope growth rate $\dot{e}$ falls off slowly as $R$ increases, with $\dot{e} = 0.0021(I_o/\tau)$ at $R = 0.80$.

One well-known choice for the linear Pockels cell material is potassium dihydrogen phosphate, $KH_2PO_4$ or KDP, which has a half wave voltage of 8730 volts at a wavelength of $\lambda = 5000$ A across a 1-cm length cell. Other attractive linear Pockels cell materials include $KD_xH_{2-x}PO_4$ (deuterated KDP), $NH_4H_2PO_4$, $ND_xH_{6-x}PO_4$, ZnS, ZnTe, CuCl and quartz, as well as some exotic Pockels cell compounds GaAs, $LiNbO_3$, $LiTaO_3$ and $BaTiO_3$, noted by A. Yariv in his book *Quantum Electronics*, Wiley and Sons, First Edition, 1967, pp. 300–311. At a representative wavelength of $\lambda = 5000$ A, the theoretical half wave voltages for these materials range from 3600–360,000 volts.

Figure 5:
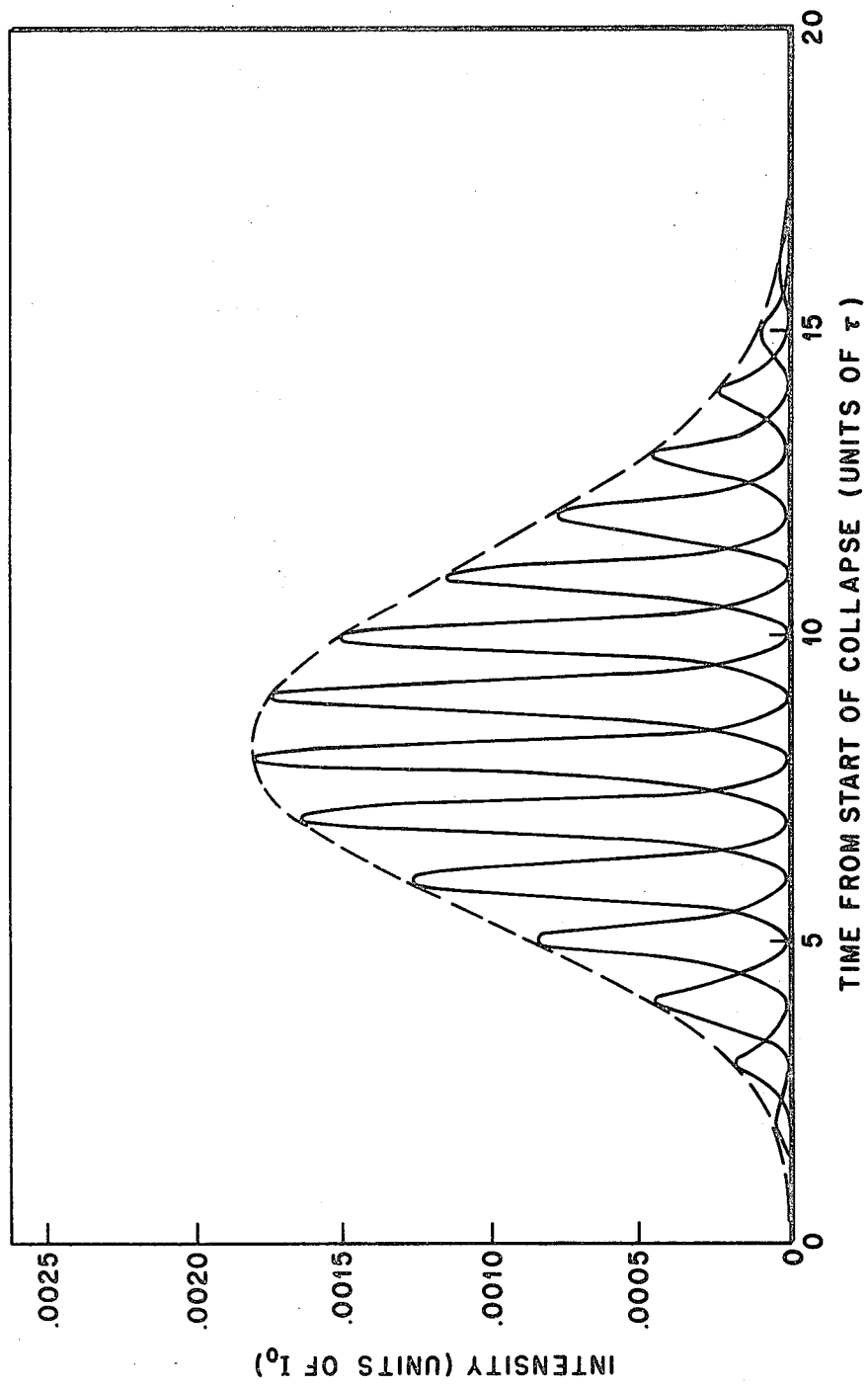
FIG. 5 graphically illustrates the output pulse train for specified parameters of the FIG. 1 embodiment.

FIG. 5, wherein intensity (in units of $I_o$) is plotted against time from start of collapse (in units of Y), exhibits a representative case with $m = 20$ ($T = 20Y$, 1–5 nsec), showing the contributions of each of the 20 time delayed pulses. Applied to laser fusion, for example, as pointed out above, the overall intensity is useful only over the rising portion of the envelope, as it is the response in this interval alone which determines whether thermonuclear burn is achieved. The efficiency of this system as set forth above, is about 0.5% with $A = 1$, $r = 0$, and $R = 0.9$. This efficiency number improves when certain delay line techniques are used to further shape the signal I(t). The dotted line indicates the approximate envelope of the pulse I(t).

Figure 6:
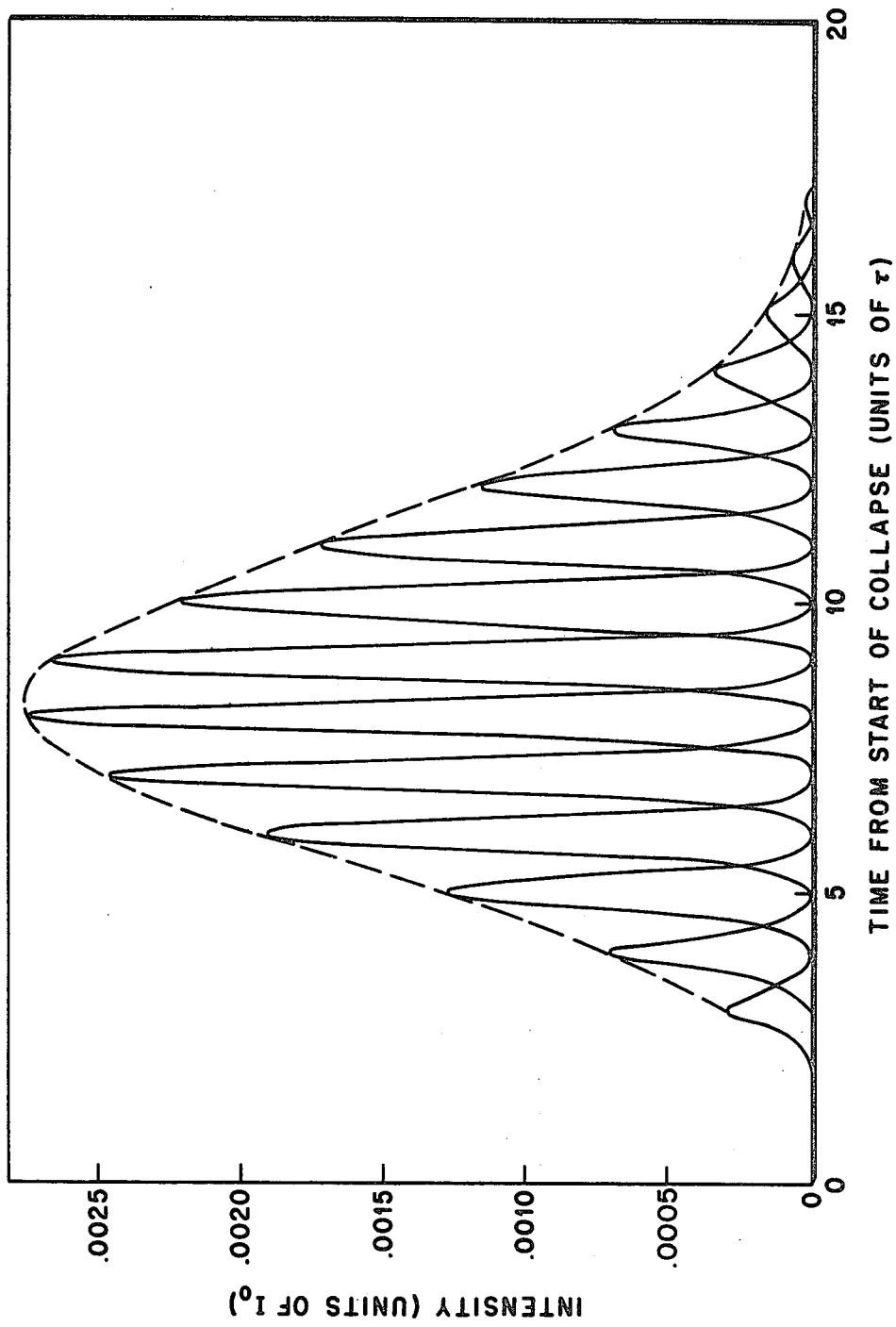
FIG. 6 is a graph with the parameters which produced FIG. 5 with an additional 10% delay in the arrival of the first pulse at the Pockels cell.

A slightly different pulse envelope can be obtained by delaying the arrival of the pulse train at the electro-optical modulator until after the voltage collapse has begun. The effect of a 10% delay is shown in FIG. 6 for the same system parameters as in FIG. 5. The efficiency of this arrangement is approximately 0.7%, for the system parameters chosen for FIG. 5.

Another variation is to reduce the initial voltage on the modulator such that the transmission at $t = 0$ is nonzero. FIG. 7 shows the resulting pulse envelope for an initial voltage of $V(O) = 1.8\ V_{1/2}$ and the same system parameters as in FIG. 5. The efficiency of this arrangement is approximately 0.9%.

A still different pulse envelope can be obtained by applying a bias voltage across the modulator. For example, FIG. 8 shows the resulting pulse envelope when a bias voltage such that $V(O) = 2V_{1/2}$ and $V(T) = -V_{1/2}$ is applied to the system with the parameters used in FIG. 5.

It is obvious that by combining any of the possible variations, etalon reflective surface spacing, initial pulse delay, voltage collapse duration, voltage magnitude, and bias voltage, still different pulse envelopes or shapes can be obtained. Similarly, if a different voltage waveform can be generated by some means, pulse envelopes of another general shape can be obtained.

Figure 2B:
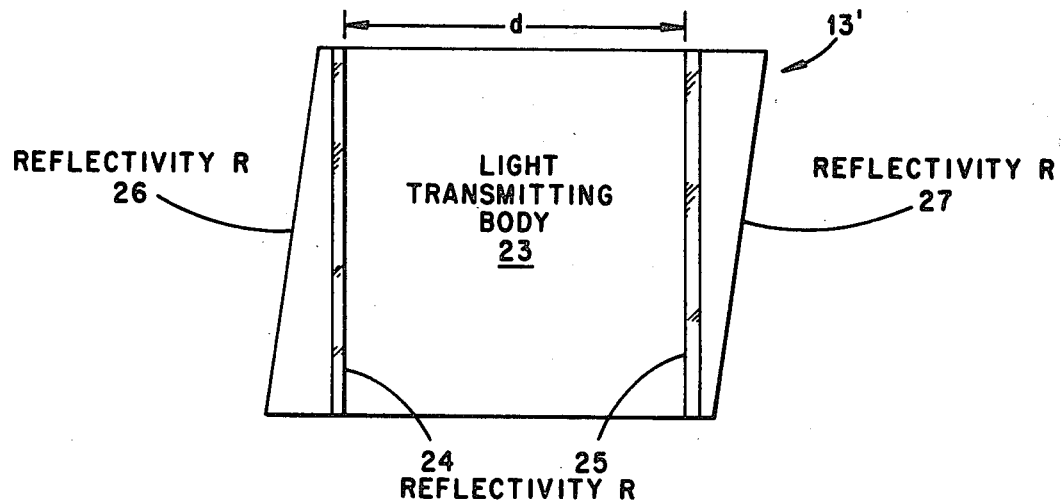

If the temporal spacing $\tau$ of the sequence of pulses is fixed, an alternative embodiment may be used: The pair of spaced reflective members comprising the FIG. 2a etalon may be replaced by a single block of light-transmissive material as illustrated in FIG. 2b, the block indicated generally at 23, is constructed, for example, from glass, having a distance "d" forming two parallel, partially reflective end faces 24 and 25 of reflectivity R which are placed in and oriented normal to the direction of propagation of the beam 10'. The two partially reflective end faces 24 and 25 are bounded by tapering surfaces 26 and 27, respectively, of reflectivity r and generate the sequence of pulses which are spaced apart in time by a multiple $n\tau$ ($n = 1, 2 \ldots$), where $\tau = 2d/c$ and $d$ is the spatial distance between said end faces. Of course, the light-transmissive block 23 should attenuate the light as little as possible.

An alternative approach, not shown, uses elliptically polarized radiation (which includes circularly-polarized radiation by definition) rather than linearly polarized radiation. The polarizer 14 in FIG. 1 is replaced by a device, such as a waveplate, which produces a definite sense of elliptical polarization in the incident radiation. If the active modulation element (electro-optical modulator 15) is initially biased by the proper voltage or magnetic field corresponding to an appropriate phase shift $1/2\phi_o$, the elliptically polarized radiation will be converted by the active modulator to radiation polarized linearly in a direction orthogonal to the transparent direction of the polarizer. If an additional voltage corresponding to a phase shift of $\pi/2$ is impressed upon the active element, the total phase shift will change from $1/2\phi_o$ to $1/2(\phi_o + \pi)$ and the radiation will become polarized in a direction along the transparent direction of the analyzer 17. This is exactly equivalent to the linearly-polarized case with zero initial voltage and half-wave final voltage. In fact, any elliptically-polarized pulse is exactly equivalent to a linearly-polarized pulse if the reference voltage is chosen to correspond to an appropriate phase shift $1/2\phi_o$ instead of zero. Thus, any change in the initial bias voltage from that corresponding to $1/2\phi_o$ in the elliptically polarized case is equivalent to adding a non-zero bias voltage in the linearly polarized case.

The active element or modulator 15 of FIG. 1 has been assumed heretofore to be a linear Pockels cell, such as illustrated in FIG. 3. This cell may be replaced by a quadratic Pockels cell or by a Kerr cell (see FIG. 4), where the phase shift is proportional to the square of the applied voltage, viz, $$\phi(t) = \phi_2 [V(t)]^2$$

The linear Pockels cell requires an active material (usually solid state) which has no center of spatial inversion symmetry. The quadratic Pockels cell and the Kerr cell utilize active materials which may have spatial inversion symmetry, such as the solid state materials $K\ Ta_{0.65} Nb_{0.35}O_3$, $K\ Ta\ O_3$, $Sr\ Ti\ O_3$, and $Ba\ Ti\ O_3$ cited by Yariv, supra, as suitable for a quadratic Pockels cell. Liquid nitrobenzene is the best known active material suitable for Kerr cells.

FIG. 4 illustrates schematically a Kerr cell positioned in the FIG. 1 system. It is understood that various embodiment of Kerr cells may be used. As shown, the Kerr cell 28 is connected via leads 21 and 22 to the power supply and optical switch assembly 16 as in FIG. 1 and is positioned beamwise in alignment with polarizer 14 and analyzer 17. Since Kerr cells are well known in the art, a detailed description or illustration of an embodiment thereof is deemed unnecessary.

Where a quadratic active material is used in the active element or modulator 15, the optimal choice of reflectivity parameter R changes vis-a-vis the choice for the linear system. The choice $R = 0.88$ maximizes system efficiency $\eta$, with $\eta_{max} = 1.5\%$ if one ignores beam attenuation in the polarizer, analyzer and active element. Maximization of pulse image envelope growth rate $\dot{e}$ with either quadratic system requires a choice $R = 0.84$, where the growth rate becomes $\dot{e} = 0.00078(I_o/\tau.)$ These values are referenced to a choice $V(t) = V_o + V_1 \sin \omega t$ as above, with $\omega T = N\omega\tau = \pi/2$ or $\pi$ and $N = 20$ pulses utilized in the modulation. Note that both the efficiency and the maximum pulse image envelope growth rate for the quadratic system are somewhat lower than that for the linear system. One putative advantage of a quadratic system is that the half-wave voltage $(1/2\phi = \pi/2)$ for the quadratic Pockels cell is typically $V_{max} \sim 75$ volts, as compared with the required half-wave voltages of 3600–360,000 volts for the linear Pockels cell. This allows shorter voltage risetimes to be used, but puts a higher demand on accuracy of the voltage magnitude as a function of time.

It should be noted that, if desired, polarizer 14 may be located upstream beamwise of etalon 13, delay line 12, or beam splitter 11, or omitted where the laser light beam 10 is previously polarized such as in the laser unit itself, as known in the laser art.

Utilizing the apparatus illustrated in FIG. 1, generation of a pulse with controllably short risetime can be readily accomplished by: (1) passing a laser beam through an etalon to form many time delayed images of the original pulses; (2) passing each of the time delayed pulses through a polarizer; (3) passing each of the polarized pulses through a Pockels cell; (4) imposing a rapidly time-varying electric field across the Pockels cell; and (5) passing the resulting Pockels cell output (sum of the pulses) through a second crossed polarizer. Also, as pointed out above, the pulse shape, or envelope, can be varied thereby providing flexibility in both the risetimes and pulse durations that can be generated by the FIG. 1 apparatus.

Figure 9:
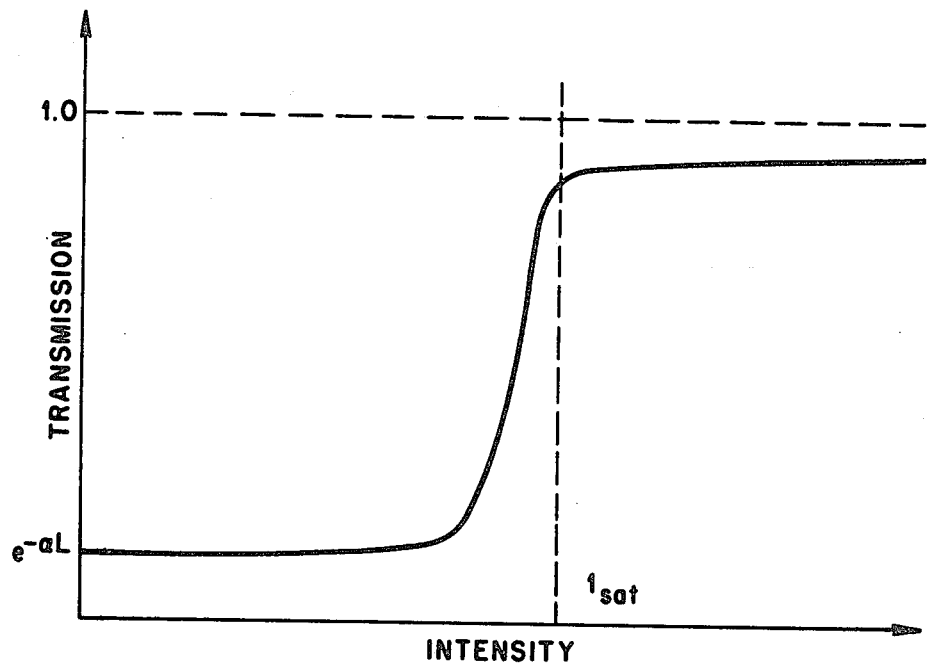
FIG. 9 graphically illustrates intensity-dependent response of a modified embodiment of the FIG. 1 pulse stacker utilizing the addition of a saturable absorber.

The FIG. 1 apparatus may be modified to achieve faster envelope risetime by the addition of a saturable absorber, indicated generally at 29, with transmission given as a function of luminous intensity graphically shown in FIG. 9 and located downstream beamwise from modulator 15, such as after the electro-optical modulator 15 or after the second (crossed) polarizer or analyzer 17 to intercept the light passed by the modulator. Until the light intensity exceeds, say, $0.80 I_{sat}$, the light transmitted by the absorber is effectively zero. However, as the intensity rises from, say, $0.80 I_{sat}$ to $1.20 I_{sat}$, the transmitted intensity rises sharply and nonlinearly to its saturation value (transmission factor $\approx 1$) and the corresponding intensity envelope rises correspondingly in time. However, this arrangement has substantially lower efficiency due to the reduced light transmission at lower intensities. The active material in the saturable absorber 29 may be $SF_6$ (useful for $\lambda = 10.6 \mu m$ radiation of a $CO_2$ laser); cresyl violet, cresyl violet acetate and nile blue A (useful for $\lambda = 0.63 \mu m$ radiation of a He-Ne laser); Eastman 9740 and 9860 (useful for $\lambda = 1.06 \mu m$ radiation of a Nd-YAG laser); rhodamine B (useful for $\lambda = 0.50-0.60 \mu m$ radiation from a rhodamine 6G dye laser); and DDI (1,1'-diethyl-2,2'-dicarbocyanine iodide) in methanol, cryptocyanine in acetone, and dicyanine A in dimethyl sulfoxide (useful for $\lambda = 0.69 \mu m$ radiation of a ruby laser).

It has thus been shown that the present invention provides an active type pulse stacking system and method which utilizes an etalon, light polarizer and analyzer means, and an electro-optical modulator, such as a Pockels cell or Kerr cell, in a pulse-forming network capable of forming and summing a sequence of time-delayed optical waveforms arising from, for example, a single laser pulse. The active pulse stacking system is extremely flexible in both the risetimes and pulse durations it can generate, and thus capable of providing the tailored laser pulses required, such as those utilized for adiabatic or isentropic compression of thermonuclear fuel pellets in laser fusion systems.

While particular embodiments have been illustrated or described, modifications will become apparent to those skilled in the art, and it is intended to cover in the appended claims all such modifications as come within the spirit and scope of the invention.

What I claim is:

1. A pulse stacking system in a pulse-forming network capable of forming and summing a sequence of time-delayed waveforms arising from a single light pulse comprising: an etalon, an electro-optical modulator positioned in aligned spaced relationship with said etalon, power supply and optical switch means operably connected to said modulator, means for polarizing a light pulse being directed into said modulator, analyzer means aligned to receive an output pulse from said modulator, said analyzer means being of a differing polarization direction with respect to said polarizing means, and pulse directing means for directing portions of an incoming pulse into said etalon and into said power supply and optical switch means.

2. The pulse stacking system defined in claim 1, additionally including an optical delay line means positioned intermediate said etalon and said pulse directing means.

3. The pulse stacking system defined in claim 1, wherein said pulse directing means includes a beam splitter.

4. The pulse stacking system defined in claim 3, wherein said pulse directing means additionally includes a reflector means positioned with respect to said beam splitter to direct a portion of an incoming light pulse split off by said beam splitter into said power supply and optical switch means.

5. The pulse stacking system defined in claim 1, wherein said etalon comprises a pair of spaced members, each of said members having a first section defining a surface of a first reflectivity, said surfaces being substantially parallel with respect to one another, said members each having a second section defining a wedge-shaped configuration of a second reflectivity.

6. The pulse stacking system defined in claim 1, wherein said power supply and optical switch means includes an optically triggered avalanche transistor circuit including phototransistor means positioned to be activated by the portion of the incoming light pulse directed into said power supply and optical switch means.

7. The pulse stacking system defined in claim 1, wherein said etalon comprises a light-transmitting body having a pair of substantially planar, partially reflective faces, said faces being spaced apart from one another.

8. The pulse stacking system defined in claim 7, wherein said light-transmitting body is composed of a solid material.

9. The pulse stacking system defined in claim 1, wherein said light pulse polarizing means comprises a polarizer located upstream beamwise from said modulator.

10. The pulse stacking system defined in claim 9, wherein said polarizer is positioned intermediate said etalon and said modulator.

11. The pulse stacking system defined in claim 1, wherein said electro-optical modulator is a Kerr cell.

12. The pulse stacking system defined in claim 1, wherein said electro-optical modulator constitutes a linear type Pockels cell.

13. The pulse stacking system defined in claim 1, wherein said electro-optical modulator constitutes a cylindrical ring electrode Pockels cell.

14. The pulse stacking system defined in claim 1, wherein said electro-optical modulator constitutes a Pockels cell, responsive to a voltage signal from said power supply and optical switch means, for producing a phase shift between two orthogonal components of a polarized light pulse.

15. The pulse stacking system defined in claim 14, wherein said phase shift of said Pockels cell is substantially linearly proportional to the magnitude of said voltage signal.

16. The pulse stacking system defined in claim 15, wherein said Pockels cell is composed of electro-optically active material selected from the group consisting of $NH_6PO_4$, $KH_2PO_4$, $NH_{6-x}$, $D_xPO_4$, $KH_{2-x}D_xPO_4$, CuCl, and ZnS.

17. The pulse stacking system defined in claim 14, wherein said phase shift of said Pockels cell is substantially proportional to the square of the magnitude of said voltage signal.

18. The pulse stacking system defined in claim 17, wherein said Pockels cell includes electro-optically active material selected from the group consisting of $KTa_{0.65}Nb_{0.35}O_3$, and $BaTiO_3$.

19. The pulse stacking system defined in claim 1, wherein said electro-optical modulator constitutes a Kerr cell, responsive to a voltage signal from said power supply and optical switch means, to produce a phase shift between two orthogonal components of a polarized light pulse which is substantially proportional to the square of the magnitude of said voltage signal.

20. The pulse stacking system defined in claim 19, wherein said Kerr cell includes electro-optically active material composed of nitrobenzene.

21. The pulse stacking system defined in claim 1, additionally including an intensity dependent saturable absorber positioned for receiving the incident radiation from said modulator and transmitting said radiation at a reduced intensity which is a nonlinear function of the incident intensity.

22. The pulse stacking system defined in claim 21, wherein said saturable absorber is located downstream beamwise from said analyzer means.

23. The pulse stacking system defined in claim 21, wherein said saturable absorber contains material selected from the group consisting of $SF_6$, cresyl violet, cresyl violet acetate, nile blue A, rhodamine B, DDI in methanol, cryptocyanine in acetone, and dicyanine A in methyl sulfoxide.

24. The pulse stacking system defined in claim 1, wherein said light pulse polarizing means comprises a polarizer producing elliptically polarized light, and wherein said electro-optical modulator is positioned intermediate said polarizer means and said analyzer means.

25. A method for generating a light pulse with controllably short risetime consisting of the steps of passing a pulse of light through an etalon to form many time-delayed pulses having images of the original pulse, passing each of the time delayed pulses through a polarizer, directing each of the polarized pulses through an electro-optical modulator, imposing a rapidly time-varying voltage across the modulator, and passing the resulting modulator output through another polarizer of differing polarization direction with respect to the first-mentioned polarizer.

26. The method defined in claim 25, additionally including the steps of splitting the light pulse prior to its entry into the etalon, and directing a portion of the thus split light pulse into optical switching means for imposing the rapid time-varying electric field across the modulator.

27. The method defined in claim 25, additionally including the step of positioning a saturable absorber downstream beamwise of the modulator for achieving faster pulse shape risetime.

28. The pulse stacking system defined in claim 1, wherein said electro-optical modulator constitutes a quadratic type Pockels cell.

* * * * *